(12) United States Patent
Brown (10) Patent No.: US 6,450,406 B2
(45) Date of Patent: Sep. 17, 2002

(54) METHOD AND APPARATUS FOR INVENTORYING SUBSTANCES

(76) Inventor: Christopher P. Brown, 1910 Madison Ave., Suite #723, Memphis, TN (US) 38104

(*) Notice: Subject to any disclaimer, the term of this patent is extended or adjusted under 35 U.S.C. 154(b) by 16 days.

(21) Appl. No.: 09/788,647

(22) Filed: Feb. 21, 2001

Related U.S. Application Data (63) Continuation-in-part of application No. 09/368,054, filed on Aug. 3, 1999, now Pat. No. 6,052,308.
(60) Provisional application No. 60/099,758, filed on Sep. 10, 1998.

(51) Int. Cl.[7] .................................................. G06K 9/22
(52) U.S. Cl. .................................. 235/462.45; 235/375
(58) Field of Search ............................. 235/375, 462.45

(56) References Cited

U.S. PATENT DOCUMENTS

| | | | |
|---|---|---|---|
| 2,936,163 A | 5/1960 | Foster | |
| 3,863,724 A | 2/1975 | Dalia, Jr. | |
| 4,419,734 A | 12/1983 | Wolfson et al. | |
| 4,563,739 A | 1/1986 | Gerpheide et al. | |
| 4,961,533 A | 10/1990 | Teller et al. | |
| 4,997,012 A | 3/1991 | Kuziw | |
| 5,174,399 A | 12/1992 | Brauneis | |
| 5,410,108 A | 4/1995 | Williams et al. | |
| 5,583,684 A | 12/1996 | Chen | |
| 5,608,193 A | 3/1997 | Almogaibil | |
| 5,654,534 A | 8/1997 | Coleman | |
| 5,703,347 A | 12/1997 | Reddersen et al. | |
| 5,736,726 A | 4/1998 | VanHorn et al. | |
| 5,744,789 A | 4/1998 | Kashi | |
| 5,986,219 A | 11/1999 | Carroll et al. | |
| 6,092,726 A | * 7/2000 | Toussant et al. | 235/375 |

FOREIGN PATENT DOCUMENTS

WO   WO 99/33008   * 7/1999

* cited by examiner

Primary Examiner—Harold I. Pitts
(74) Attorney, Agent, or Firm—Richard C. Litman (57) ABSTRACT

A portable, integrated scanner/scale apparatus capable of scanning and weighing articles of inventory and particularly intended for use with a method of inventorying bottled liquids, specifically liquor at a bar, or pharmaceuticals. The integrated scanner/scale apparatus is defined by a housing containing a scanner, a weighing scale, and a plurality of other components used by the scanner/scale apparatus for gathering, recording, and distributing inventory data. Housed inside the integrated scanner/scale apparatus is a memory device for storing information obtained from the scanner/scale apparatus, a display device for displaying data either generated by the scanner or scale or entered by the key pad, and a serial port or RF communications devices for enabling interconnection between the memory device and a personal computer having a software program for calculating inventory stock amounts and profits, etc.

20 Claims, 6 Drawing Sheets

METHOD AND APPARATUS FOR INVENTORYING SUBSTANCES

CROSS REFERENCE TO RELATED APPLICATIONS

This application is a Continuation-In-Part of U.S. Application Ser. No. 09/368,454 filed Aug. 3, 1999, now abandoned, now U.S. Pat. No. 6,052,308 which claims the benefit of U.S. Provisional Patent Application Ser. No. 60/099,758, filed Sep. 10, 1998.

BACKGROUND OF THE INVENTION

1. Field of the Invention

The present invention relates generally to data gathering systems and, more particularly, to a portable, integrated scanner/scale apparatus for scanning and weighing substances, and method of use thereof. Any substance in a container having a bar code, such as bottled liquids or pharmaceuticals in bottles or jars can be inventoried by the present invention. Inventorying the former is primarily intended for tracking inventory in restaurant and bar establishments, with the latter being useful in pharmacies or pharmaceutical manufacturing facilities or research laboratories.

2. Description of the Related Art

Controlling inventory, especially for the small business person or entrepreneur, is critical to financial success. To be understocked during peak business times is disastrous and to be overstocked is unsound fiscally and simply poor business practice. Businesses that cater to a specific market and that require a relatively large inventory of a specific product or type of product are especially sensitive and vulnerable to changes in the demand for their services and/or products, for example, seasonal fluctuations, holidays, and special occasions. This is especially true for restaurants where the average usage of goods and services over time tends to be volatile. Therefore, rapidly assessing the available inventory and adjusting the inventory up (increase) or down (decease) in accordance with the anticipated demand is crucial to financial success and fiscal solvency.

Although data acquisition or gathering systems of the type installed in checkout counters in supermarkets are now commonplace, other applications of the components comprising such systems are limited. Typically such system includes a scanner which scans or reads bar codes, industrial symbols, alphanumeric characters or other indicia for object recognition. Typically, bar code labels or other indicia are read as items are passed over a scanning window in the top surface of the scanner. The bar code or other indicia is then converted into product identification and pricing information which may be used for inventory control. Such existing data gathering systems also typically include a scale which allows a check-out clerk to weigh items which are sold according to weight, such as produce. The weight may then be fed directly to the point-of-sale terminal for purposes of calculating a price.

The scanner component typically includes a light source such as a laser, a rotating mirror driven by a motor, and a mirror array. The laser beam is reflected off the rotating mirror and mirror array to produce a pattern of scanning light beams. As a bar code or other indicia on the item is passed over the aperture or window, the scanning light beams scatter off the bar code or other indicia, and a carrier signal returns to the data gathering system where it is collected and detected. The scale component of such data gathering systems typically comprises a top plate on which the item to be weighed is placed. The top plate may also include an aperture or window whose location corresponds to the window of the scanner and through which the scanning light beams pass.

Several data gathering systems are defined by a scanner and scale mounted in a counter top. For example, U.S. Pat. No. 5,410,108, issued on Apr. 25, 1995 to Kevin J. Williams et al., describes a combined laser scanner and weigh scale having an integrated construction and a rigid casing. Similarly, U.S. Pat. No. 5,174,399, issued on Dec. 29, 1992 to James E. Brauneis, also describes an integrated construction for a scanner/scale assembly. A problem found in each of these configurations is that they are not portable for enabling the systems to be moved to different locations.

Another problem with certain data gathering systems is that they lack a convenient means for storing information obtained by the data gathering systems. For example, several known integrated units having a scanner and a scale lack a memory means for storing information in a database. Consequently, information acquired by the scanner and scale is typically recorded by either printing out the information or writing the information by hand. Such a method of recording data is undesirable because it wastes considerable amounts of paper and presents an added burden in paper management and storage.

U.S. Pat. No. 5,583,684, issued on Dec. 10, 1996 to James Chen, describes a scanning lens fixing device. Chen does not suggest an integrated scanner/scale apparatus according to the claimed invention.

U.S. Pat. No. 5,654,534, issued on Aug. 5, 1997 to Edward P. Coleman, describes a portable hand held scanning terminal. Coleman does not suggest an integrated scanner/scale apparatus according to the claimed invention.

U.S. Pat. No. 5,703,347, issued on Dec. 30, 1997 to Brad R. Reddersen et al., describes an interface selection and configuration system for a computer peripheral in which configuration for the peripheral and/or the host interface is at least in part accomplished by the interface connector cable. Reddersen et al. do not suggest an integrated scanner/scale apparatus according to the claimed invention.

U.S. Pat. No. 5,736,726, issued on Apr. 7, 1998 to David B. VanHorn et al., describes a portable hand held scanning terminal. VanHorn et al. do not suggest an integrated scanner/scale apparatus according to the claimed invention.

U.S. Pat. No. 5,744,789, issued on Apr. 28, 1998 to Motofumi Kashi, describes a bar code reader having a memory for storing information read by a reading section and a key pad capable of inputting data into the memory. However, Kashi does not disclose integration of the bar code reader with a scale for use in scanning and weight articles of inventory. Kashi does not suggest an integrated scanner/scale apparatus according to the claimed invention.

U.S. Pat. No. 2,936,163, issued on May 10, 1960 to Carroll C. Foster, describes a bar accessory which will indicate the amount of fluid or liquid such as liquor that has been used up U.S. Pat. No. 3,863,724, issued on Feb. 4, 1975 to Nichola Dalia, Jr., describes a method and apparatus for determining and accounting for the amount of material dispensed from a container, such as the amount of alcoholic beverage dispensed from a bottle thereof.

U.S. Pat. No. 4,419,734, issued on Dec. 6, 1983 to William Wolfson et al., describes an inventory control system which, utilizes at each of a plurality of storage areas, means including load-responsive transducers arranged to detect changes in the total weight presented by the articles stored in each area.

U.S. Pat. No. 4,563,739, issued on Jan. 7, 1986 to George E. Gerpheide et al., describes a computer based system for, taking inventory and obtaining inventory reports on numerous products which are dispensed in full containers or in quantities from partially filled containers. The Gerpheide et al. apparatus is self-contained in that it provides inventory and other reports without interfacing with a remote computer. Software updates and programming is more difficult, if not impossible, in the absence of a remote computer. Additionally the apparatus of Gerpheide et al. does not allow for the entry of other data (as in the remote computer which can interface with the instant invention), such as costs, receipts, etc., to be used in the preparation of reports. Further, this apparatus does not include means for receiving information from a remote computer.

U.S. Pat. No. 4,961,533, issued on Oct. 9, 1990 to David M. Teller et al., describes an apparatus for determining the volume contents of a plurality of containers, such as bottles containing alcoholic beverages.

U.S. Pat. No. 4,997,012, issued on Mar. 5, 1991 to Swiatoslaw Kuziw, describes a method of dispensing at a tap an effervescent liquid from a keg-like supply. The method comprises the steps of continuously monitoring the weight of the supply and generating an output corresponding thereto, collecting at the tap the liquid that overflows from a vessel into which it is being dispensed, weighing the collected overflow liquid and generating an output corresponding to this weight, comparing the outputs and calculating the difference therebetween, and periodically recording the difference.

U.S. Pat. No. 5,608,193, issued on Mar. 4, 1997 to Ali H. Almogaibil, describes an electronic scale for tracking an inventory of tools before and after maintenance work to assure that no tools were left behind after the work was completed and no parts were accidentally removed from the work site and kept with the tools.

U.S. Pat. No. 6,092,726, issued on Jul. 25, 2000 to John Toussant et al., teaches a scale for weighing consumable products which can upload data to a computer.

U.S. Pat. No. 5,986,219, issued on Nov. 16, 1999 to Nicholas C. Carrol et al. teaches a method of inventorying liquor in which a plurality of liquor bottles are weighed for determining the amount of liquor used. A computer program is used to facilitate this method.

Thus, although the prior art is replete with data gathering systems employing similar components including scanners and scales, none have the appropriate combination of features necessary for expediently and accurately inventorying bottled fluid volumes by weight in environments which depend upon accurate inventory records for day to day operations. More specifically, restaurants and bars have specialized problems and needs. Operations depend upon recording the volume of drinks sold on a nightly basis in order to establish inventories of the bottled fluids, such as liquor. These inventory records are then used to calculate drinks per bottle poured, cost and profit margins per bottle, and daily consumption volumes used to restock and to continue day to day operations.

Yet, at present, the preferred method of inventorying used by such establishments is crude and time consuming, namely, to have an individual visually "eyeball" the volume of liquor contained in each individual bottle at the end of each day of operations, and therefrom calculate a difference. Some obvious problems with such a method include its dependence upon an entirely subjective opinion of volume, as between different individuals, as from day to day even if performed by the same individual, and as between different bottles sizes, shapes and transparency, even if performed at the same time by the same individual. Thus an apparatus and method is needed and desired which can effectively, quickly, accurately and repetitively measure fluid volumes held by a large number of bottles of different sizes, weights and transparency.

None of the above described inventions and patents, taken either singularly or in combination, is seen to describe the instant invention as claimed, nor addresses the needs and problems as discussed.

SUMMARY OF THE INVENTION

The present invention is a portable, integrated scanner/scale apparatus for use in scanning and weighing articles, specifically bottles, jars, or other containers applied with bar codes or similar coding recording inventory information. The integrated scanner/scale apparatus includes a portable housing defined by an outer housing wall for housing all components of the scanner/scale apparatus, a bar code scanner for scanning coded articles of inventory, a scale formed in the outer housing wall for weighing articles of inventory, and a memory device contained within the housing that is operatively connected to both the bar code scanner and to the scale for storing information read by the bar code scanner. To transfer data read and stored by the scanner/scale apparatus to a remote personal computer, a serial port is provided in the outer housing wall and is connected to the memory device. Alternatively, an RF transmitter can be located internal to the housing for data transfer to the remote computer. A display device is operatively connected to the bar code scanner for visually displaying the information to a user.

By employing this device, an operator of a restaurant, bar, pharmacy, research laboratory, etc. can rapidly weigh containers labelled with a bar code. The method of use initially includes entering information by a remote computer into the memory device to create a database. The device may receive data by an RF receiver located inside the housing. In the case of a restaurant or bar, such information may include the type of liquor, brand name, and number of fluid ounces as stated on the label of any given brand, which is typically encoded into the bar code supplied by the bottler, and the fluid weight as weighed by the scale. In addition, the scale may be used with a software program on a personal computer, wherein variables can be entered to be associated with the bar code information stored in the memory device. For example, the variables may include important but missing bar code information (e.g. specific identifying descriptions), figures associated with sales data, and calculations dependent upon each bottle volume. Such figures and calculations may include the total number of drinks (shots) per bottle volume to be obtained from a given volume bottle, the cost per bottle, and the sales price per shot. In this way, calculations can be performed by the associated software and computer which can be linked to the scanner/scale apparatus, either through the serial port or the RF transmitter, which assists the proprietor of the establishment in determining usage and profits from daily operations.

Possible inputs include the gross weight of a product including the weight of its contents, the amount of product purchased in a specific time period, and the gross sales per product in a specific time period. From the given inputs, the remote computer can convert all gross mass ounce weights to net volume ounces, track product usage, pour costs, create order forms and par sheets, create graphs, and track sales, usage, holding costs, total purchases and total drink numbers on a weekly, monthly, or annual basis. The scanner/scale apparatus, which serves as an input device for the remote computer, is indispensable to the bar or restaurant proprietor. With the scanner/scale apparatus inputting data into a software program on a remote computer, appropriate percentages can be established, and budgets and cost projections for future fiscal periods can be created.

It is noted that inputs, outputs, and terms of measurement may vary depending on the article inventoried, i.e. for liquor or pharmaceuticals. The flexibility afforded by the remote software allows for the programming to accommodate the management of any type of inventory.

It is a principal object of the invention to provide a portable, integrated scanner/scale apparatus for use in scanning and weighing articles of inventory at various locations for input into a computer.

It is another object of the invention to provide a portable, integrated scanner/scale apparatus which includes a memory device contained therein for storing information produced by the scanner/scale apparatus.

It is a further object of the invention to provide an integrated scanner/scale apparatus having an input device for inputting data to a remote computer.

It is a further object of the invention to provide an integrated scanner/scale apparatus having a display means formed therein for displaying data related to scanned and weighed articles.

Still another object of the invention is to provide an input device so that a remotely-located computer can generate inventory reports, and software updates and programming can be done on the computer.

Yet another object of the invention is to provide a system which has the flexibility to operate with different or differently-programmed remotely-located software such that any type of inventory can be managed.

It is an object of the invention to provide improved elements and arrangements thereof in an integrated scanner/scale apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
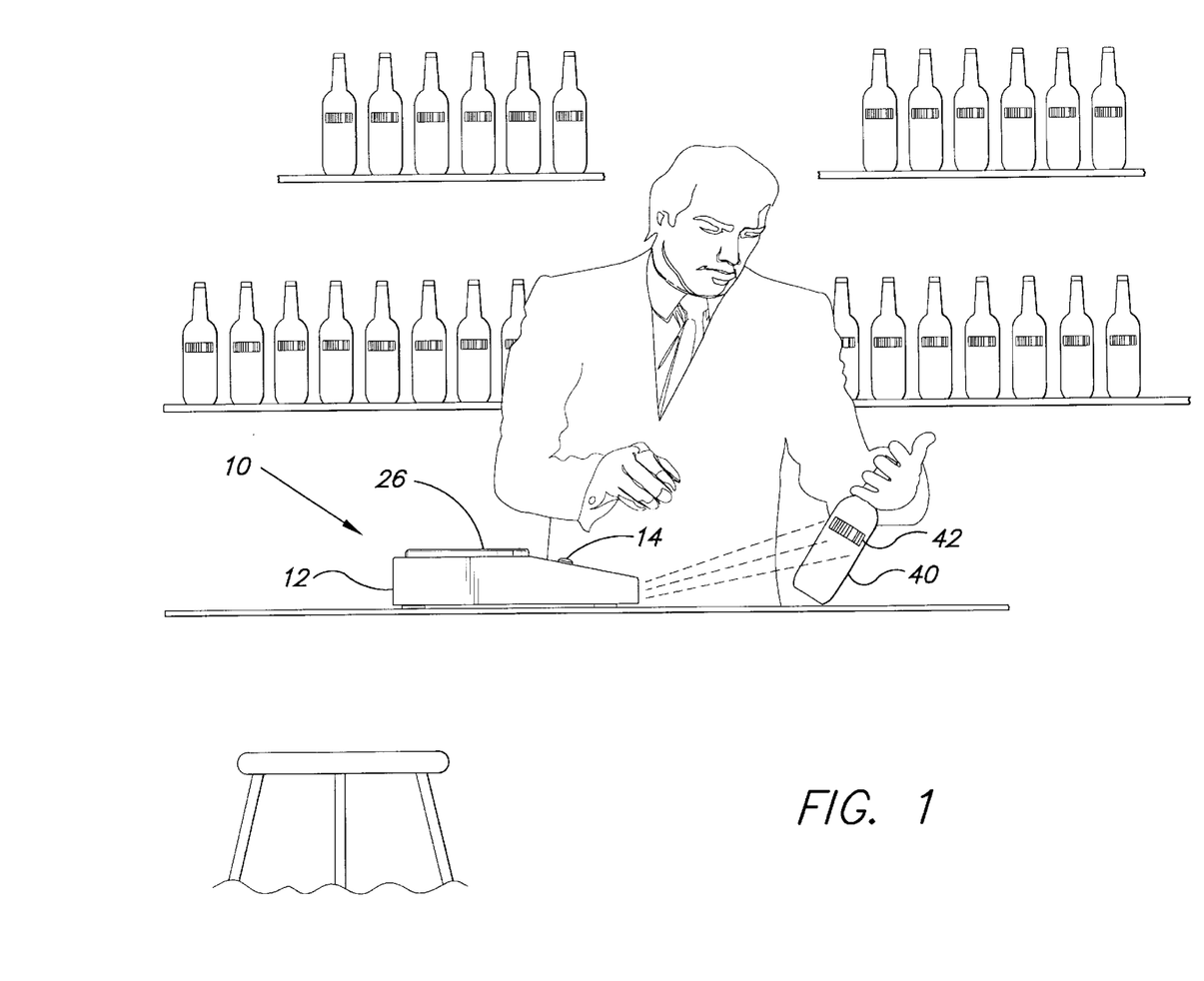
FIG. 1 is an environmental, perspective view of an integrated scanner/scale apparatus according to the present invention.

The present invention is a portable, integrated scanner/scale apparatus for scanning and weighing articles of inventory. FIG. 1 shows an environmental perspective view of a portable, integrated scanner/scale apparatus 10 according to the present invention. Because the scanner/scale apparatus 10 is portable, it may be used at almost any location for use with relatively small sized articles of inventory, such as bottles, jars, or other small containers. Thus, the scanner/scale apparatus 10 provides a convenient means for scanning and weighing articles of inventory at practically any inventory site.

For example, FIG. 1 illustrates use of the scanner/scale apparatus 10 in a bar for scanning and weighing bottles 40 of liquor stored in the bar. It is noted that the instant invention can be used for pharmaceuticals or other types of inventory. As shown, each of the bottles 40 of liquor possesses a bar code label 42 for enabling a bar code scanner 28 (best seen in FIG. 2) to scan each of the bottles 40 of liquor for inventory purposes. The scanner/scale apparatus 10 can be conveniently placed, for example, on a counter in the bar for scanning the bottles 40 where they are stored for day to day use.

Figure 2:
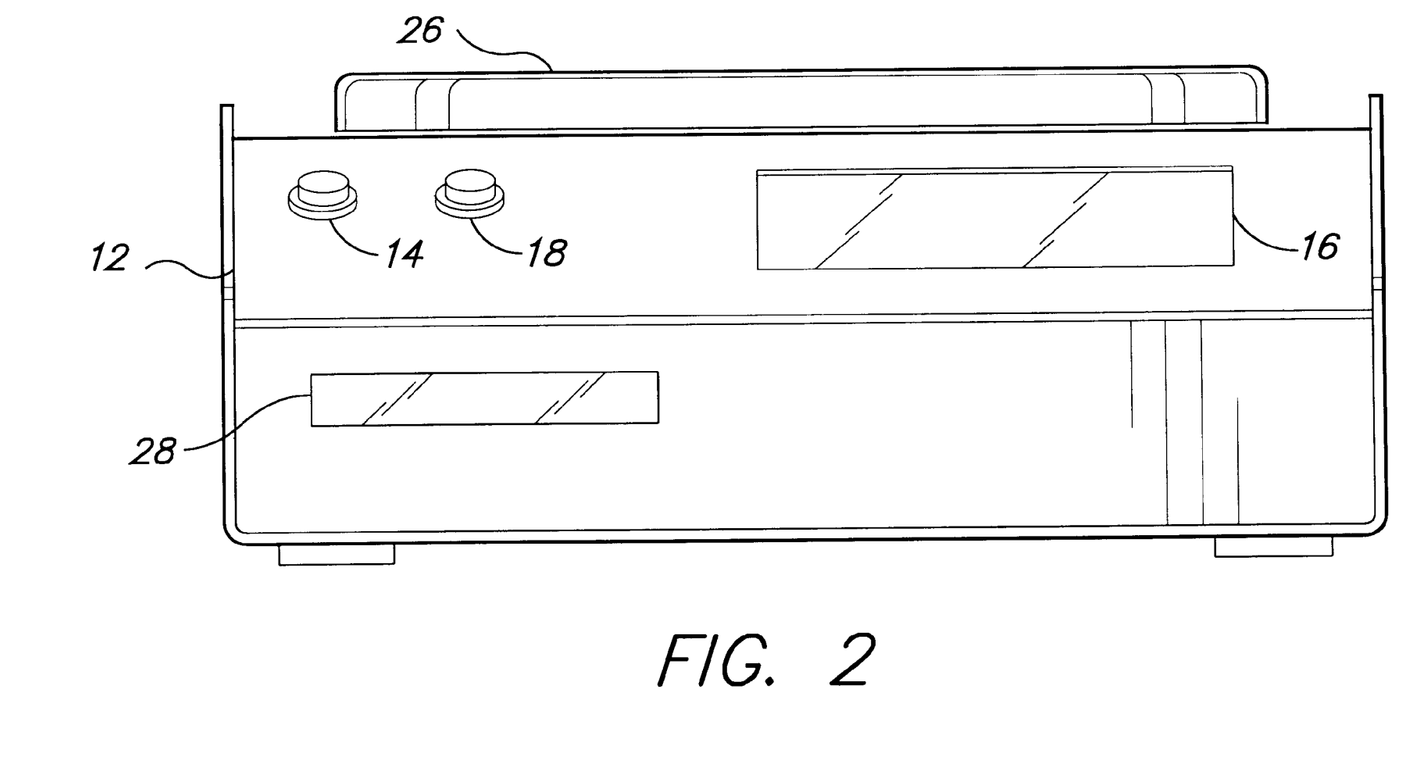
FIG. 2 is a front elevational view of an integrated scanner/scale apparatus according to the present invention.
Figure 3A:
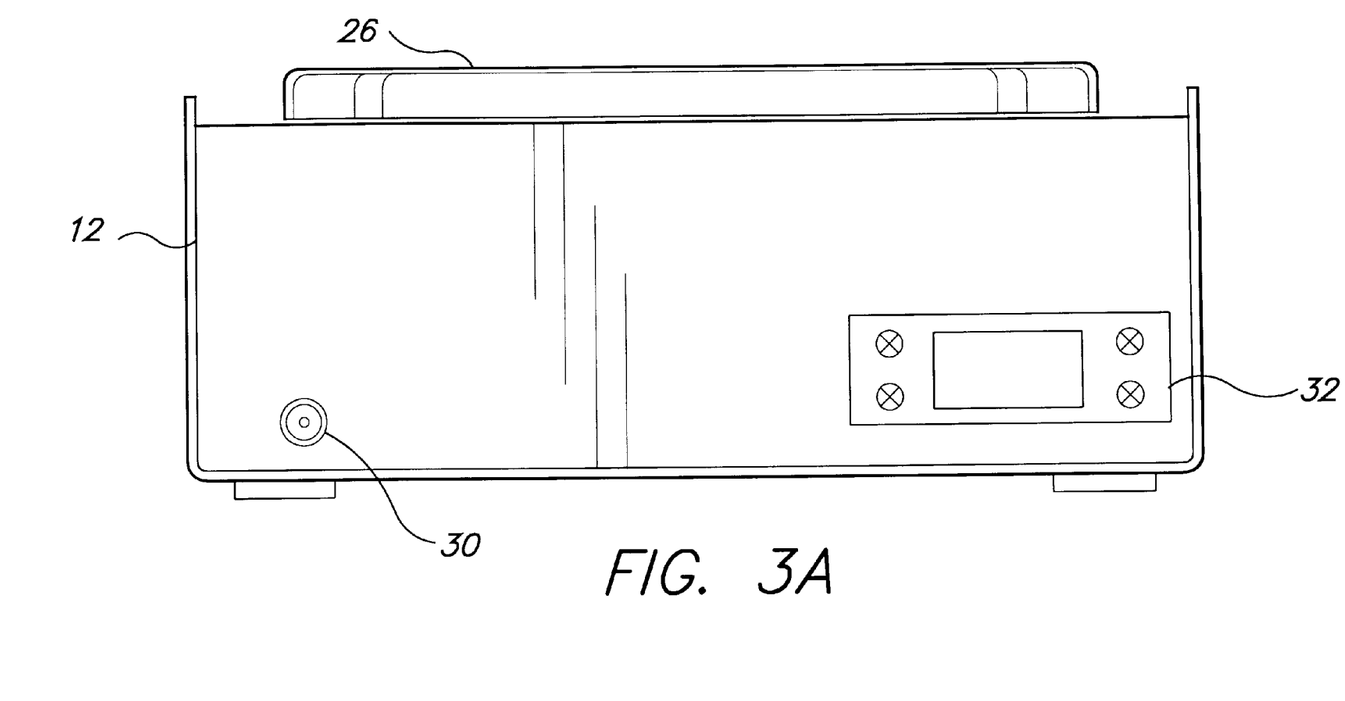
FIG. 3A is a back elevational view of one embodiment of an integrated scanner/scale apparatus according to the present invention.
Figure 3B:
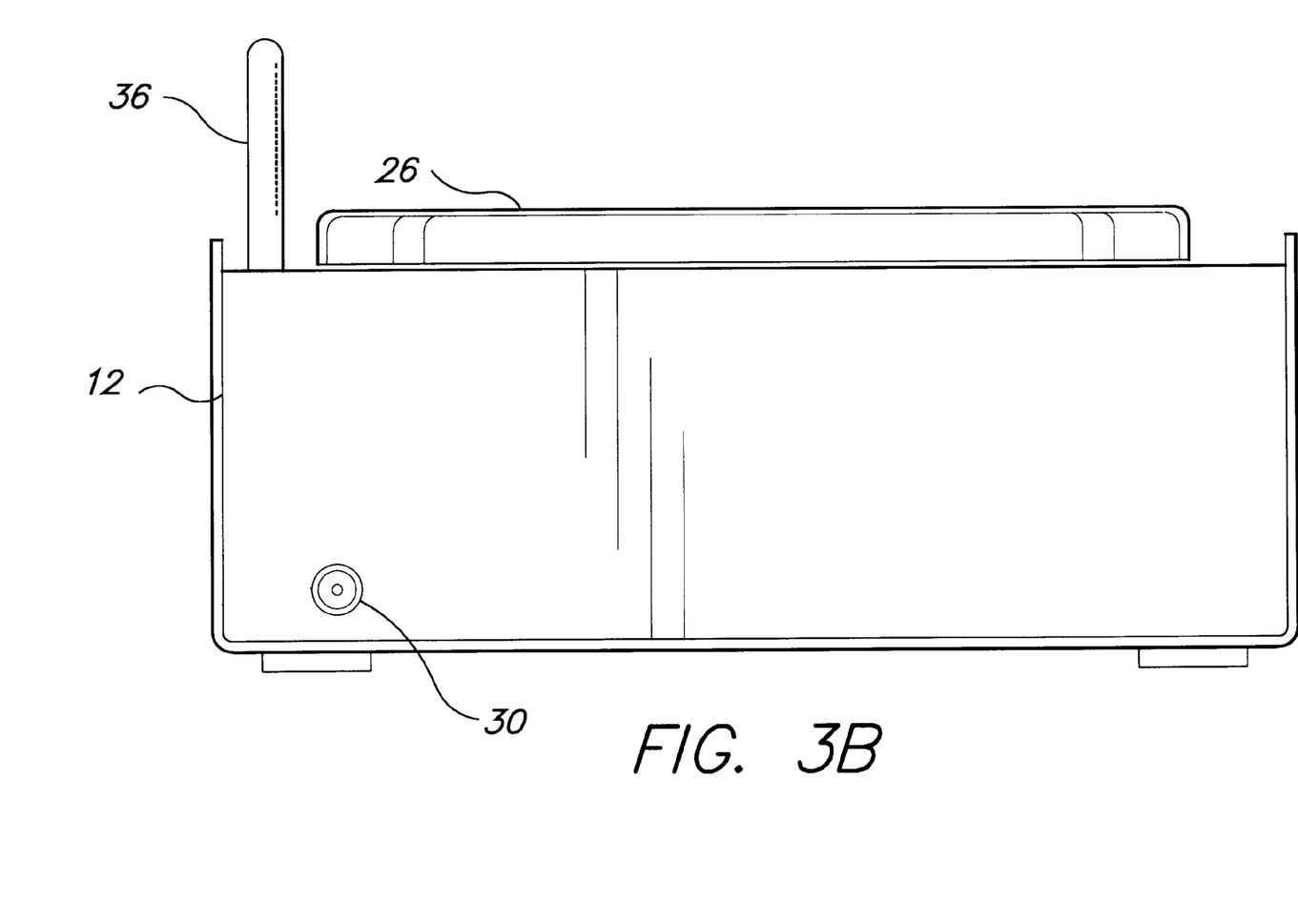
FIG. 3B is a back elevational view of another embodiment of an integrated scanner/scale apparatus according to the present invention.

Viewing FIGS. 1–3 together, it can be seen that the scanner/scale apparatus 10 is generally defined by a housing 12 having a scale 26 disposed therein for measuring the weight of an article of inventory. The housing 12 further includes a bar code scanner 28 for reading encoded data. The housing 12 still further includes a display 16 for displaying data. The scanner/scale apparatus 10 is further defined by a memory device 58, such as a memory chip, housed in the housing 12 for storing data, specifically the bar code information and weight as weighed by scale 26.

Each of these elements are operatively connected and preferably powered by an internal rechargeable battery. It is noted that any known power source, e.g. an A.C. power plug and cord electrically connected to a conventional A.C. power source, can be used. A receptacle 30 for a recharger allows for recharging of the battery. An "on" switch 14 (it is noted that a toggle switch on the rear of the unit would also suffice) is provided to activate the scanner/scale apparatus 10 and a "tare" switch 18 is provided for calibrating, i.e. "zeroing" the scale. The housing 12 also houses a serial port 32 (FIG. 3A) or has an antenna 36 mounted on it (FIG. 3B) for connecting the scanner/scale apparatus 10 to a personal computer having software programmable capabilities.

Preferably, the housing 12 is constructed of plastic. However, the housing 12 may be made of any material, such as metal, according to the desires of the user. The housing 12 is generally defined by a top wall, a bottom wall, a back wall, a front wall, and two side walls. The top wall is defined by a flat portion and an inclined portion. The flat portion is oriented horizontally for supporting the scale 26 in a horizontal position. Formed in the flat portion is the scale 26 for weighing relatively small-sized articles of inventory. The scale 26 is connected by conventional circuitry to the memory device 58 for transmitting weight measurements from the scale 26 to the memory device 58.

The inclined portion is defined by a surface having a downward inclination and includes a display 16 for displaying inventory data. Preferably, the display 16 is a light emitting diode display or a liquid crystal display having a nine character read out for displaying any combination of up to nine alphanumeric characters simultaneously. Further, the invention contemplates the inclusion of scrolling means (not shown) to enhance the utility of the display 16. Vertically disposed buttons immediately adjacent the display 16 are contemplated for scrolling the display 16 so more information can be presented.

Formed in the front wall of the scanner/scale apparatus 10 is the bar code scanner 28 for reading encoded data from a bar code label. The bar code scanner 28 is connected by conventional circuitry to the aforementioned memory device 58 for transmitting bar code data to the memory device 58. Preferably, the bar code scanner 28 is a conventional infrared scanner. Alternatively, the bar code scanner 28 may be a conventional laser scanner. By passing an article possessing a bar code by the bar code scanner 28, the bar code scanner 28 can scan and identify particular articles of inventory.

Figure 4:
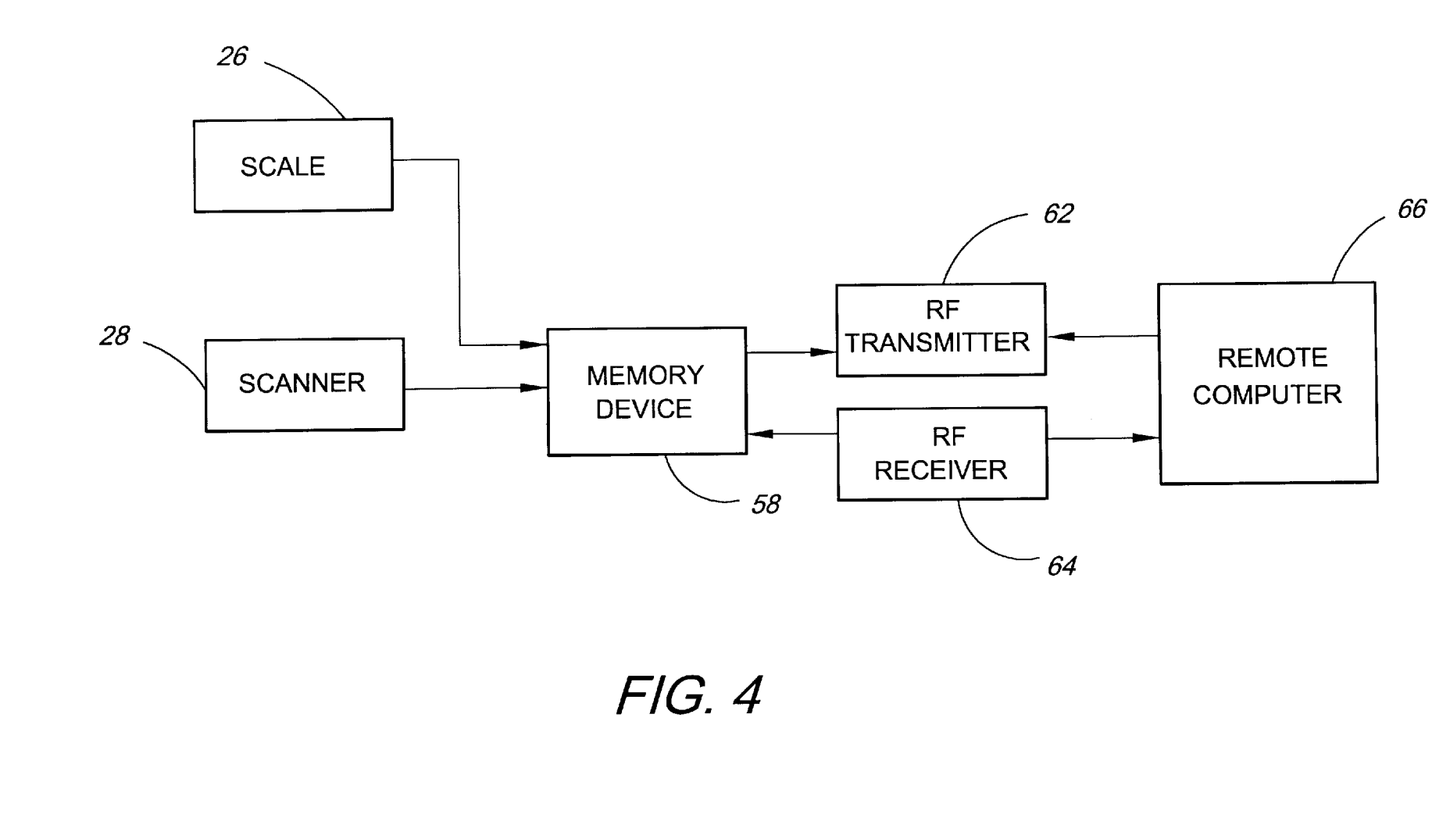
FIG. 4 is a block diagram of an integrated scanner/scale apparatus according to the present invention.

Formed into the housing 12 is a serial port 32 for connecting an external data source to the scanner/scale apparatus 10. Preferably, the serial port 32 is an RS-232 serial port capable of connecting to a conventional personal computer. The serial port 32 is connected by conventional communication means to the memory device 58 for enabling data transfer between the memory device 58 and a conventional personal computer 66 (as seen in FIG. 4). The personal computer 66 is loaded with software 80 programmed to perform the operational method as described below in the discussion of FIG. 5.

In another embodiment, the apparatus includes an internal RF transmitter 62 for inputting data into the computer 66. The apparatus also includes an RF receiver 64 for receiving information from the computer 66 regarding UPC data so that the data is displayed on the display 16 when the UPC is read. It is noted that the transmitter 62 and receiver 64 are shown as separate units in FIG. 4; however, they can be located in one unit. The antenna 36 allows for the reception.

Next, a method of inventorying using the scanner/scale apparatus 10 of the present invention will be described. After activating the apparatus 10 with the "on" switch 14, the scale 26 can then be zeroed by the "tare" switch 18. Once a zero reading has been obtained, the scanner/scale apparatus 10 is ready for use in obtaining an inventory.

The display 16 will read "ENTER B/C" to prompt the user to first place a bar coded article of inventory in front of the bar code scanner 28 for scanning a bar code. The user must then place an article of inventory in front of the bar code scanner 28 enabling the bar code scanner 28 to read (i.e., scan) a bar code label 42 on an article of inventory. Typical information includes the type of liquor, brand name, and number of fluid ounces as stated on the label of any given brand, typically encoded into the bar code supplied by the bottler. As above, it is noted that the description with respect to inventorying liquor is merely for exemplary purposes, and it will be apparent to one skilled in the art that the instant method and apparatus can be used for inventorying pharmaceuticals or any other substance.

The user may then enter a description of the article of inventory using the keyboard on the remote computer 66 to create a data file name to be linked with a particular bar code label 42. For example, if the brand of the bottled liquor is "Wild Turkey" bourbon, an encoded entry may be "W_TURKEY" to correspond to the limited display window. Thereafter, when the bar code scanner 28 rescans a bar code label 42 possessing data contained in an existing data file, a description of the article of inventory associated with that data will be displayed on the display 16 for identifying the article of inventory to which the bar code label is attached.

After a scan, if the bar code scanner 28 succeeds in reading the bar code label 42, a single beep will sound signaling that the article of inventory has been read. The single beep also serves the function of triggering on the scale 26. Alternatively, if the bar code scanner 28 fails to read a bar code label 42 when an article of inventory is placed in front thereof, or fails to find information programmed as a field in the memory device 58, the user must manually enter the numbers of the bar code by using the key board on the remote computer 66 for entering the bar code data into the memory device 58, or other information requested on the display in alphanumeric form. A single beep will sound upon completing this entry for signaling to the user that the data has been successfully entered into the memory device 58. The single beep is likewise associated with the function of triggering or turning on the scale 26.

Thereafter, an item of inventory must be placed on the scale 26 within a predetermined time period, preferably five seconds, to weigh the scanned item of inventory. If an item is not placed on the scale 26 within the allotted time, a buzzer sound signals the user that the item was not weighed and the user must begin again by repeating the aforementioned steps starting with placing a bar coded article of inventory in front of the bar code scanner 28 to enter it into the memory device 58.

The scale 26 will then weigh the particular article of inventory and display the weight measurement on the display 16 for notifying the user of the weight measurement of the article of inventory. A double beep will sound concurrently with the display step for signifying to the user that the weight data has been stored in the memory device 58. This ends the sequence of data entry and may be repeated as often as necessary to inventory all bottles and create a database.

The software on the remote computer 66 is capable of generating inventories and cost reports. The software receives the recorded entries as to weight and bar code from the scanner/scale apparatus 10 by means of the serial port 32 and an appropriate cable or the RF transmitter 62. The software is engineered to permit entry of variables to be associated with the bar code information stored in the memory device 58. The variables may include important but missing bar code information and, more importantly, figures associated with sales data and calculation formulas useful to restaurant and bar proprietors, which are typically dependent upon each bottle volume and may be calculated on either a daily, weekly or monthly basis. Such variable figures and calculation formulas may include the total number of drinks (shots) per bottle volume to be obtained from a given volume bottle, the cost per bottle, and the sales price per shot. In this way, calculations can be performed by the computer 66 linked to the scanner/scale apparatus 10, which assists the proprietor of the establishment in determining usage and profits from its operation, preferably by generating a spreadsheet of fields or cells for figures quantifying generally manually performed economic calculations used in the restaurant and bar business.

The software resides on the remote computer 66 and typical inventory software operates as follows. The software starts by obtaining the basic information gathered by the scanner/scale apparatus 10 for processing by the software. For example, assuming a bar inventory of one hundred bottles containing different liquors, each liquor type would have been identified by its bar code by the scanner 28 to provide basic identifying data and associated numerical data including a full bottle volume (FBV) as factory bottled and delivered (in fluid ounces or milliliters). In addition, the scale 26 has acquired the gross mass weight (preferably in ounces or grams) of each of the one hundred bottles when weighed containing fluid after opening, termed herein "partial bottle weight" (PBW). Furthermore, a mass weight of an identical bottle when empty, termed herein the "empty bottle weight" (EBW), for each of the one hundred liquor bottles may be obtained by weighing. Alternatively, the software may be preprogrammed to include average EBW's for selected bottle shapes or sizes of each liquor type, stored in a separate permanent data file.

For each individual liquor bottle, the software is programmed to calculate a partial bottle volume (PBV) by using the EBW (empty bottle weight) and PBW (partial bottle weight). Calculations performed start by subtracting the EBW from PBW to determine a net volume weight of the fluid contained by the bottle (NVW), shown by the formula NVW=PBW−EBW. Next, the NVW (mass weight preferably in ounces or grams) is converted into fluid volume by applying known physical laws, specifically that the density of a liquid is equal to its mass divided by volume. The software includes a file of the known liquor densities (preferably in gm/ml or wt.oz./fl.oz), from which it seeks the appropriate liquor density (LD) associated with the identified liquor. The resulting calculation yields volume contained by the opened bottle (PBV), expressed as PBV= (PBW −EBW)/LD or PBV=NVW/LD. The difference between FBV and PBV would equal the volume of liquor used (LVU), or FBV−PBV=LVU, and is then calculated by the software as well for entry into a spreadsheet field or cell.

The PBV is then used by the software to calculate finance and operational figures. For example, ordering decisions may be made by the proprietor based upon a spreadsheet cell generated on a personal computer monitor screen or by printer output, such cell showing product usage (PU) over a predetermined period of time, as based on the PBV divided by the predetermined time period (T), or PU=PBV/T. Likewise, holding cost for the product may output to a screen or printer cell in a spreadsheet, calculated according to well known economic formulas.

The software also uses PBV to compare with unit sales of drink purchases. For example, a spreadsheet cell may be generated which shows a percentage of total unit sales (TUS) to a monetary unit cost of PBV ($PBV), i.e. TUS/$PBV=% TUS may be programmed to be defined as price per drink (PPD) (e.g. $2.00/1.5 oz liquor by brand) times the number of drinks or units sold (#US) as determined by register receipts (which may also be entered into the personal computer using standard cash register technology), wherein a predetermined drink recipe uses a constant number of shots (i.e. number of shots per drink or NOS), and wherein shot size (SS) is a constant volume (e.g. 1.5 or 1.0 oz.) as determined by the proprietor. Thus drink sales can be defined as TUS=PPD×#US, to yield a TUS figure in a monetary unit, e.g. dollars/volume units. TUS thus is divided by $PBV (also in dollars/volume unit, corrected for a common volume unit denominator with TUS) to obtain a percentage. A proprietor can thus determine the percentage of the PBV being used for drink sales, i.e. the profit margin, where a downward percentage trend, or, a low percentage relative to a predetermined profit margin constant per bottle, may indicate theft, excessive spillage, or inefficient shot measurement.

Figure 5:
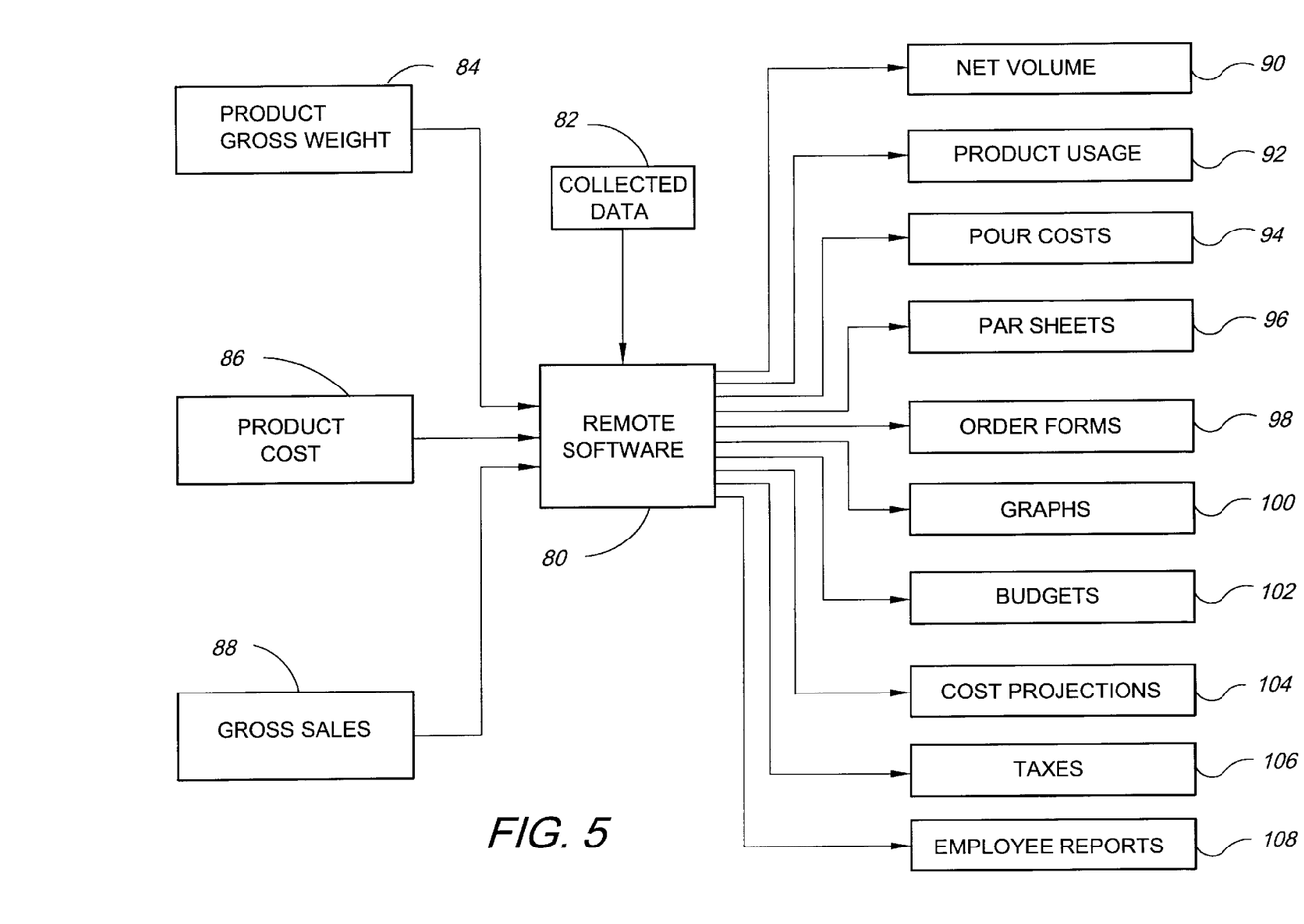
FIG. 5 is a flow chart of exemplary software which may be resident on a remote computer.

A flow chart of exemplary software, which may be used on a remote computer, is shown in FIG. 5. As shown the software 80 receives collected data 82 from the apparatus 10, product gross weight 84, product cost 86, and gross sales 88. The inputs are consolidated and computations are performed which result in outputs from the remote computer 66 including reports indicating the inventory net volume 90, the inventory product usage 92, the pour costs 94, par sheets 96, order forms 98, graphs 100, budgets 102, cost projections 104, taxes 106, and employee reports 108.

The scanner/scale apparatus 10 of the present invention eliminates the tedious task of guessing how much liquid is still available to serve to customers. The error-prone process of visually estimating the amount of beverage remaining in a bottle is completely avoided by using the scanner/scale apparatus 10 of the present invention. The accurate determination of how many ounces of liquid are contained in a bottle make it possible for the proprietor to correctly determine how many drinks can be made from a bottle. Therefore, accurate determinations of how much profit can be expected from a bottle of liquor can be made. Without an accurate calibration of the quantity of liquor available at a bar, purchase orders and profit expectations will be erroneous.

It is to be understood that the present invention is not limited to the embodiments described above, but encompasses any and all embodiments within the scope of the following claims.

I claim:

1. A portable system for collecting data for inventory analysis and report preparation comprising:
   a housing being defined by an outer housing wall for housing all components of the system;
   a scanner formed in said outer housing wall for scanning coded articles of inventory;
   a scale formed in said outer housing wall for weighing articles of inventory;
   a memory device housed inside of said outer housing wall and operatively connected to both said scanner and to said scale for storing information read by said scanner;
   a display device formed in said outer housing wall and operatively connected to said scanner device for displaying data; and
   means for transferring data to a remote computer.

2. The system according to claim 1 wherein said scanner is an infrared scanner.

3. The system according to claim 1 wherein said scanner is a laser scanner.

4. The system according to claim 1 wherein said means for transferring data is an RF transmitter.

5. The system according to claim 1 wherein said means for transferring data is a serial port.

6. The system according to claim 1 wherein said housing is constructed of plastic material.

7. The system according to claim 1 wherein said housing is constructed of metal material.

8. The system according to claim 1 further including means to receive data from a remote computer.

9. The system according to claim 8 wherein said means to receive data is an RF receiver.

10. An inventory management system comprising:
    a portable system for collecting data for inventory analysis and report preparation including:
      a housing being defined by an outer housing wall;
      a scanner formed in said outer housing wall for scanning coded articles of inventory;
      a scale formed in said outer housing wall for weighing articles of inventory;

a memory device housed inside of said outer housing wall and operatively connected to both said scanner and to said scale for storing information read by said scanner;

a display device formed in said outer housing wall and operatively connected to said scanner device and said key pad for displaying data; and means for transferring data to a remote computer; and a remotely-located computer which can be operatively connected to said means for transferring data.

11. The management system of claim 10 wherein said computer can run any type of inventory management or report generation software available.

12. The management system of claim 10 further including software for inventory management and report generation.

13. The system according to claim 10 wherein said scanner is an infrared scanner.

14. The system according to claim 10 wherein said scanner is a laser scanner.

15. The system according to claim 10 wherein said means for transferring data is an RF transmitter.

16. The system according to claim 10 wherein said means for transferring data is a serial port.

17. The system according to claim 10 further including means to receive data from said remote computer.

18. The system according to claim 17 wherein said means to receive data is an RF receiver.

19. A method of inventorying bar coded articles comprising:

(a) creating an electronic database of information including fields of entry of the description of an article, the weight of the article, and data encoded by machine readable labels attached to the article;

(b) scanning a bar code label of the article;

(c) weighing the article after scanning is complete; and (d) transmitting data obtained from said scanning and said weighing to a remotely-located computer for analysis and report preparation.

20. The method of claim 19 further including the step of operating software on the remotely-located computer which analyzes the results of said scanning and weighing.

* * * * *